3,037,044
HALOGENATED ORGANIC PHOSPHORUS COMPOUNDS AND PROCESS THEREFOR

Herman A. Bruson, North Haven, and Thomas P. O'Day, Hamden, Conn., assignors to Olin Mathieson Chemical Corporation
No Drawing. Filed Nov. 3, 1959, Ser. No. 850,532
3 Claims. (Cl. 260—461)

This invention relates to novel halogenated organic phosphorus compounds, and particularly to phosphorus-containing derivatives of halogenated cyclopentadienes and process of making the same.

The main object of this invention has been to prepare novel phosphorus-containing derivatives of halogenated cyclopentadiene. Other objects have included the provision of a novel process for the preparation of such derivatives.

In accordance with this invention, it has been found that halogenated cyclopentadienes, such as hexachlorocyclopentadiene and hexabromocyclopentadiene, react with one or two molecular equivalents of certain organic phosphites to form addition products. Such adducts can be converted, by the loss of one or two halogen atoms as halides, to penta- or tetra-halogenocyclopentadiene phosphonates according to the following equations:

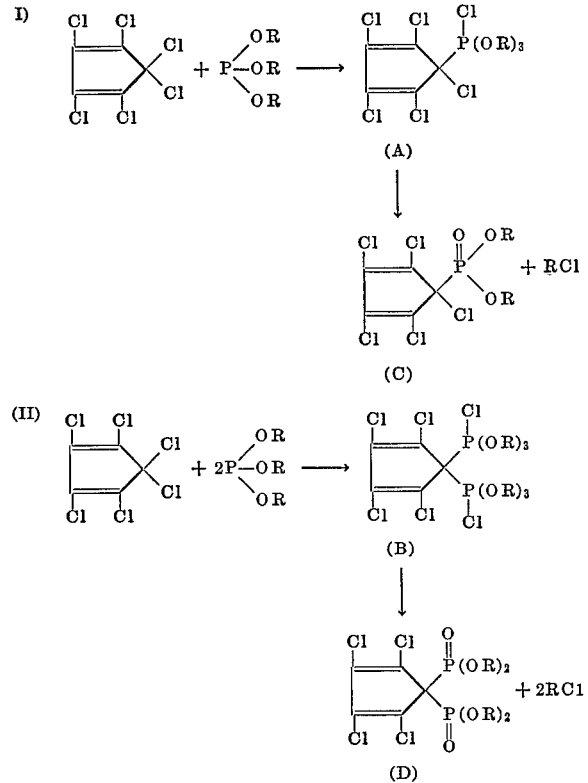

The reaction between the hexahalogeno-cyclopentadiene and the organic phosphite is strongly exothermic and is best carried out by the careful addition and mixing of the two reactants with suitable cooling to a temperature between about 0° and 50° C. In order to control the exothermic reaction, it is desirable to use inert organic solvents such as hydrocarbons, ethers or alcohols to dilute the mixture. Of these, benzene, xylene, dioxane, methanol and diethyl ether are particularly useful.

When the organic radical R is of low molecular weight such as methyl, ethyl, isopropyl or butyl, it is possible to distill the adducts (A) and (B) shown above, under high vacuum, of less than 1.0 mm. of mercury, without decomposition. However, (A) and (B) readily split off alkyl halide at elevated temperatures to form (C) and (D) respectively.

The reactions can be carried out with a wide variety of organic phosphites in which R can be any alkyl, aryl, aralkyl, cycloalkyl, hydroxyalkyl, alkoxyalkyl, chloroalkyl, chloroaryl, alkoxyaryl, nitroaryl or other olefin-free organic radical. Typical of these are, for example, the following:

trimethyl phosphite,
triethyl phosphite,
triisopropyl phosphite,
tributyl phosphite,
trihexyl phosphite,
triisooctyl phosphite,
tridodecyl phosphite,
trihexadecyl phosphite,
tris(2-chloroethyl) phosphite,
tris(2-ethylhexyl) phosphite,
tris(2-methoxyethyl) phosphite,
tris(2-ethoxyethyl) phosphite,
tris(2-benzyloxyethyl) phosphite,
tris(2-para-chlorophenoxyethyl) phosphite,
triphenyl phosphite,
tricresyl phosphite,
tris(2,4-dichlorophenyl) phosphite,
tris(para-methoxyphenyl) phosphite.

The phosphites can be reacted with the hexahalogen-cyclopentadiene in a molecular ratio of 1:1 or 2:1. For optimum yields of the monophosphonate, it is advantageous to employ an excess of the hexa-halogeno-cyclopentadiene. When the diphosphonate is desired, a slight excess of the phosphite over the 2:1 ratio gives almost quantitative yields of the desired product.

The reaction forming the adducts is surprisingly vigorous and exothermic and it is generally advisable to add one of the reagents gradually to the reaction mixture containing the other reagent, and to provide adequate cooling to maintain the reaction temperature at between about 0° and 50° C.

The ease of splitting off organic halide from the halogenated cyclopentadiene-phosphite adducts varies with the phosphite. Adducts with the lower alkyl phosphites are relatively stable and may be distilled under vacuum, while adducts formed with organic phosphites containing 6 or more carbon atoms tend to split off organic halide and yield the corresponding phosphonate at temperatures over about 40° to 50° C. The conversion of adduct to phosphonate can generally be completed by heating at above 100° C. or for several hours at about 80° C., for example, by refluxing in the presence of benzene or other inert organic solvent.

The following specific examples constitute illustrative embodiments of the invention.

Example 1

In a 500 cc. flask equipped with a stirrer, condenser, thermometer, and dropping funnel, there were placed 109.2 g. (0.4 mol) of freshly distilled hexachlorocyclopentadiene and 250 cc. of pure dry benzene. The solution was cooled to 2° C. by means of an ice bath and 50 g. (0.2 mol) of freshly distilled tri-n-butylphosphite was added dropwise during a 4 hour period while maintaining the reaction mixture between 2° and 6° C. by means of the ice bath, the solution turning dark red. When the addition was complete, stirring was continued with the ice bath around the flask for several hours and the solution was then permitted to warm to room temperature overnight (18 hours).

The solution was distilled at about 50° C. under vacuum of 100 to 200 mm. Hg to remove the benzene; and the residual oil was then distilled in vacuum of 0.5 mm. The product containing some unreacted hexachlorocyclopentadiene distilled as a yellow oil at 55–88°/0.5 mm. (wt. 130 g.), leaving 21 g. of undistilled residue. The yellow oil was fractionally distilled in vacuum under nitrogen to yield 35 g. of product boiling at 76–78° C./0.7 mm.; $n_D^{25}$ 1.4780. A sample was redistilled at 76–77.5°/0.6 mm.; $n_D^{25}$ 1.4765 and analyzed as follows:

|  | Percent C | Percent H | Percent Cl | Percent P |
|---|---|---|---|---|
| Calcd. for $C_{17}H_{27}Cl_5PO_3$ | 39.01 | 5.16 | 40.72 | 5.93 |
| Found | 38.72 | 5.18 | 40.50 | 5.98 |

NOTE.—Percent Ionizable chlorine: Calcd. 6.79. Found 7.23.

This corresponds to the compound having the structural formula:

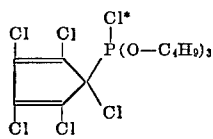

*Ionizable Cl.

*Example 2*

In a 500 cc. 3-necked flask equipped with stirrer, dropping funnel and thermometer was placed 54.6 g. (.2 mole) of freshly distilled hexachlorocyclopentadiene and 300 cc. of dry benzene. This solution was cooled to 2° C. Then 118.6 g. (.44 mole) of tris(2-chloroethyl) phosphite was added dropwise over a three hour period while maintaining the reaction temperature at 2–6° C. with an ice bath. After the addition was complete, the reaction mixture was allowed to warm in one to two hours to room temperature, with stirring.

The volatile compounds, such as benzene, unreacted phosphite, ethylene chloride, and hexachlorocyclopentadiene were removed by distillation at 60–75° C. under vacuum (13 mm. mercury). A dark oily residue of 156 g. was obtained, which could not be distilled without decomposition at 120° C. in high vacuum (0.5 mm. Hg).

The oil was dissolved in benzene, heated to about 75° C., treated with decolorizing carbon, and filtered through a Celite pad. When the benzene was removed in vacuo, there was obtained 126 g. of a deep red oil. This material analyzed as follows:

|  | Percent C | Percent H | Percent Cl | Percent P |
|---|---|---|---|---|
| Calcd. for $C_{13}H_{16}O_6P_2Cl_8$ | 25.41 | 2.61 | 46.25 | 10.10 |
| Found | 25.60 | 2.70 | 46.80 | 8.92 |

The compound has a composition corresponding to the formula:

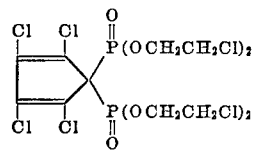

In the same manner as described above, hexabromocyclopentadiene yields a dark red oil having the formula

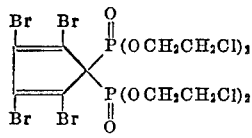

which could not be distilled at 120° C. in vacuum without decomposition.

In similar manner, hexachlorocyclopentadiene was reacted with trimethyl phosphite, triisopropyl phosphite and tris (2-ethyl hexyl) phosphite, respectively, to yield the corresponding tetrachlorocyclopentadiene diphosphonates.

*Example 3*

In a 500 cc. 3-necked flask equipped with stirrer, thermometer and dropping funnel, there was placed 81.9 g. (.3 mole) of freshly distilled hexachlorocyclopentadiene. Then, 109.5 g. (.66 mole) of triethyl phosphite was added dropwise over a two hour period. The reaction was quite exothermic, and the reaction temperature was maintained between 30–40° C. by the use of an ice bath. After the addition was complete, the reaction mixture was stirred at 30° C. for two hours. The reaction mixture was then transferred to a distilling flask.

After distillation, there was obtained 155 g. of a light yellow liquid, B.P. 81–110° C./14 mm. This material was redistilled and 109 g. of light yellow liquid, B.P. 82–85° C./13 mm., $n_D^{25}$=1.4381, was obtained. This material was analyzed, with the following results

|  | Percent P | Percent Cl |
|---|---|---|
| Calcd. for $C_{13}H_{20}O_6P_2Cl_4$ | 13.03 | 29.83 |
| Found | 13.10 | 28.50 |

This corresponds to the compound having the structural formula:

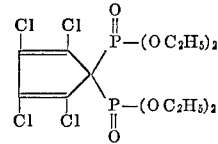

*Example 4*

In a 1 liter 3-necked flask equipped with stirrer, dropping funnel and thermometer, there was placed 218.4 g. (.8 mole) of hexachlorocyclopentadiene and 400 cc. of dry benzene. The solution was cooled to 2° C. Then 133.6 g. (.4 mole) of trihexyl phosphite was slowly added over a four hour period, the reaction temperature being maintained between 2–9° C. After the addition was completed, the reaction mixture was allowed to warm to room temperature. The solution was then heated under reflux for 8 hours at 80° C. The benzene was removed in vacuo, and the residual oil (346 g.) was transferred to a distilling flask. The unreacted hexachlorocyclopentadiene and other volatile compounds were removed by distillation at 60–70° C./.7 mm. There remained as a residue 201.5 g. of a dark colored oil, which yielded a positive test for chloride ion.

The residue was subjected to steam distillation for several hours, during which a few cc. of yellow oil were collected in the receiver. The residual oil was extracted with chloroform, dried with anhydrous sodium sulfate and filtered. The residue which was obtained after volatilization of the chloroform was a deep red oil, 172.5 g., $n_D^{25}$=1.4700. This material gas no test for chloride ion, which had evidently been removed by hydrolysis during the steam distillation. Analysis of the product corresponds to the following structural formula:

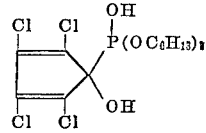

|  | Percent C | Percent H | Percent Cl |
|---|---|---|---|
| Calcd. for $C_{23}H_{41}O_5PCl_4$ | 48.42 | 7.19 | 24.91 |
| Found | 47.75 | 7.22 | 25.02 |

The above-described products have utility in the arts, particularly as fire-retardant plasticizers of vinyl resins, for example, polyvinyl chloride, polyvinyl acetate, vinyl chlorideacetate copolymer, polyacrylates and polyalkacrylates. Generally, for such use, the compounded plastic contains about 5 to 35% of the plasticizer. At times, mixtures of two or more products in accordance with this invention may be used with advantage and in such cases, the mixture may be formed directly by reaction of the desired mixture of reagents.

For many applications, the product or products need not be extensively purified, the removal of volatile compounds, treatment with decolorizing carbon or other decolorizer, and filtration being sufficient to yield suitable material.

The phosphite adducts and the phosphonates derived therefrom, made in accordance with this invention also constitutes useful additives to lubricating compositions, being particularly well adapted for uses requiring extreme pressure lubricants.

By condensation reactions with polyhydric alcohols such as ethylene glycol and other glycols, glycerol, pentaerythritol and the like, the above-described phosphonates yield non-inflammable polyester resins which may advantageously be used in coatings. The products formed with the use of the lower alkyl phosphites, particularly those in which the alkyl group contains less than 7 carbon atoms, are preferred as most reactive for the preparation of resins.

Also, the above-described products of this invention display marked insecticidal, fungicidal, herbicidal, and moth-proofing properties, the adducts being particularly adapted for use as soil fumigants.

What is claimed is:
1. Tetrachlorocyclopentadiene diphosphonate wherein the phosphonate group consists of

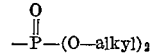

the said alkyl containing less than seven carbon atoms.

2. Tetrachlorocyclopentadiene diphosphonate wherein the phosphonate group consists of

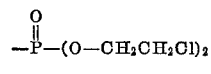

3. Tetrachlorocyclopentadiene diphosphonate wherein the phosphonate group consists of

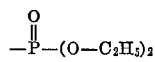

References Cited in the file of this patent
UNITED STATES PATENTS 2,806,049    Raab et al. _____ Sept. 10, 1957

FOREIGN PATENTS 557,104    Canada _____ May 6, 1958